July 7, 1959  R. W. HADLEY  2,893,529
DIFFERENTIAL TRANSFORMER PRESS CONTROL
Filed May 28, 1956  2 Sheets-Sheet 1

INVENTOR.
ROBERT W. HADLEY
BY
Williams & Tilbury
ATTORNEYS

United States Patent Office 2,893,529
Patented July 7, 1959

2,893,529

DIFFERENTIAL TRANSFORMER PRESS CONTROL

Robert W. Hadley, Toledo, Ohio, assignor to E. W. Bliss Company, Canton, Ohio, a corporation of Delaware Application May 28, 1956, Serial No. 587,591

8 Claims. (Cl. 192—142)

This invention relates to power operated presses and in particular to the electrical controls used in connection with the operation of such presses.

The controls for most presses allow three different types of operations to be performed, the jogging operation used in setting up the dies on such a press, single stroke operation in which the operator must set the press in operation for each stroke after which the press stops, and continuous operation in which the press continues to run until the stop button has been pushed. The rotation of a press crankshaft is controlled by the operation of the clutch which drivingly engages it, and a brake which brings the crankshaft to a stop. Therefore, all of the control circuits for a press must regulate the operation of the clutch and brake. In providing for the above mentioned types of operation, it has been found necessary to use control devices which operate in response to the angular position of the crankshaft or some other rotatable shaft of the press. It has been the practice in the past to employ rotary limit switches of one form or another for this purpose, but it is well known that such switches have certain inherent weaknesses such as contact arcing, contact wear, with consequent undesirable change of the timing points of the switch, and a maximum speed limit of rotation.

Therefore, it is an object of this invention to provide a novel press control circuit having no make and break contacts other than those found in relays. Another object of this invention is to provide a press control circuit in which a differential transformer is used in a novel manner as the element operating responsive to the position of the press crankshaft. It is a further object of this invention to utilize a magnetic amplifier in a novel manner to control the operation of the press clutch and brake. It is also an object of this invention to provide a clutch control circuit which is comparatively trouble free in operation and which requires little preventive maintenance to maintain it in operating condition.

The apparatus and the manner in which it may be employed may be best understood by reference to an embodiment shown in the accompanying drawings and specification together with the appended claims.

Figure 1:
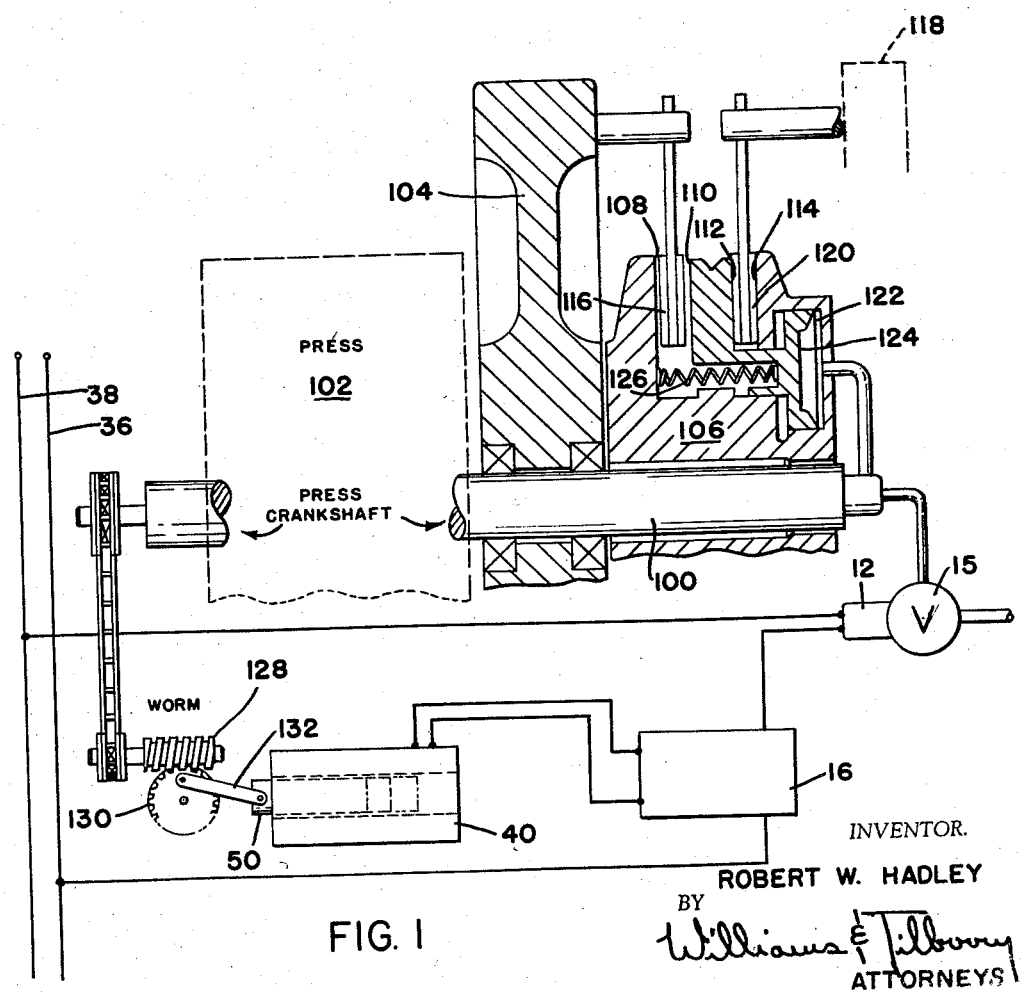
Figure 1 is a fragmentary schematic elevational view with parts in section showing the connection between a press crankshaft and the core of a differential transformer.

Referring now to Figure 1, a crankshaft 100 of a press 102 is shown with a flywheel 104 rotatably mounted thereon. A conventional clutch and brake assembly unit 106 is keyed to the shaft 100 and includes clutch plate members 108 and 110, and brake plate members 112 and 114. Rigidly fastened to the flywheel 104 is a clutch plate member 116, and rigidly fastened to a frame member 118 of the press is a brake plate 120. The clutch and brake assembly 106 also includes an annular cylinder 122 and pistons 124 for engaging the clutch plates and dis-engaging the brake plates. When the piston 124 is de-activated, spring means 126 releases the clutch plates and re-engages the brake plates. All of the above is standard practice, is well understood by those skilled in the art, and does not constitute any part of the invention per se.

In a preferred embodiment of the invention, the crankshaft 100 is chain and sprocket drive connected to a worm 128 adapted to drive a worm wheel 130. A connecting rod 132 is pivotally secured between worm wheel 130 and a shiftable transformer core 50 adapted to reciprocate in a differential transformer 40. A magnetic amplifier 16 is connected between the differential transformer 40 and the solenoid 12, which is adapted to actuate the clutch operating valve 15. Thus the position of core 50 of differential transformer 40 determines whether magnetic amplifier 16 is sufficiently energized to operate solenoid 12. By timing the position of core 50 with respect to the movement of crankshaft 100, the clutch and brake mechanism can be actuated according to a predetermined cycle.

Figure 2:
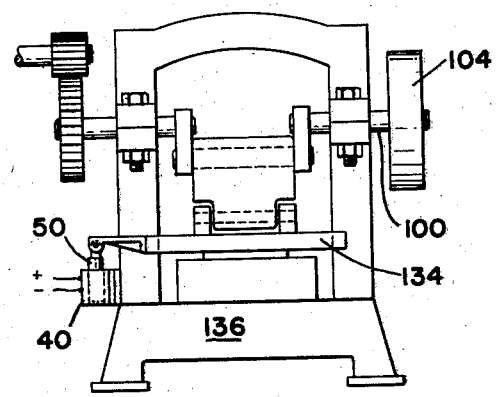
Figure 2 is an elevational view of a press showing the core of a differential transformer secured to the slide of the press for reciprocating movement by means other than shown in Figure 1.

Figure 2 illustrates yet another embodiment of the invention wherein the core 50 of the differential transformer 40 is reciprocated by means of a direct connection with the slide member 134 of a press 136. The number of mechanisms suitable for reciprocating the core 50 and the transformer 40 is unlimited, and no emphasis is intended to be made on a particular means for reciprocating the core. The two embodiments shown in Figures 1 and 2, however, are felt sufficient to illustrate the principle of the invention.

Figure 3:
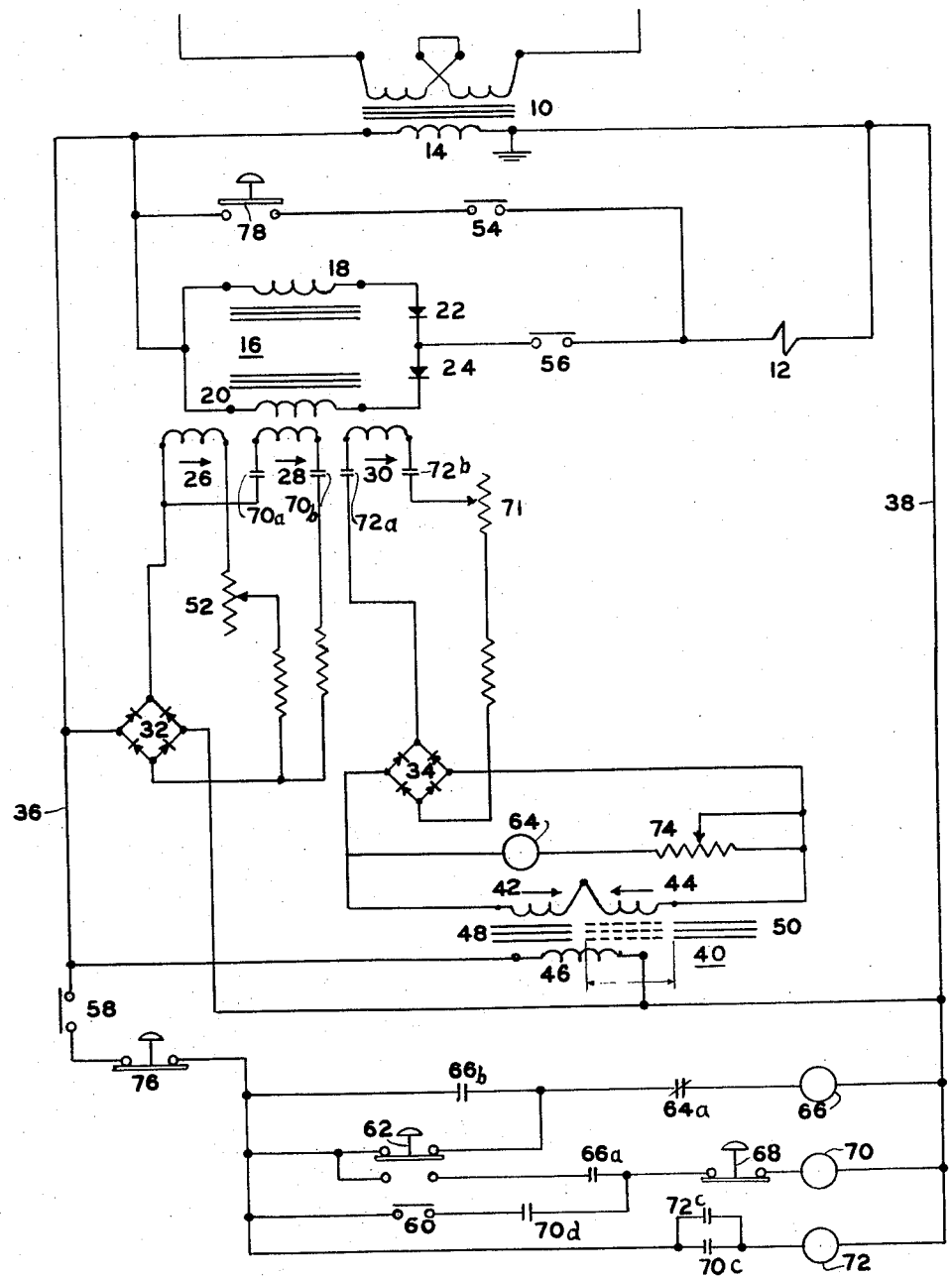
Figure 3 is a schematic wiring diagram of a press control circuit employing an embodiment of the present invention.

Referring now to Figure 3, it will be seen that power is supplied to a press control circuit by a transformer 10. The clutch operating valve solenoid 12 such as would be used to control the operation of an air valve in an air operated clutch is connected to the secondary 14 of transformer 10. A magnetic amplifier 16 is then connected in series to the clutch operating valve solenoid 12. This magnetic amplifier 16 has secondary legs 18 and 20 connected in parallel. Rectifiers 22 and 24 are in series with each of the legs 18 and 20, and are connected to maintain a unidirectional current in the legs by having each one conduct on alternate half cycles. Three control windings 26, 28 and 30 are wound on the magnetic amplifier so as to control the flux in both legs in a manner well known in the art.

All three control windings 26, 28 and 30 are supplied with direct current, windings 26 and 28 being powered by rectifier 32 and winding 30 being powered by a second rectifier 34. It is to be noted that all three control windings are so wound upon each of the legs 18 and 20 that the flux produced by current through the control windings is always additive and none of the control windings are used to oppose one another. The input of rectifier 32 is connected directly to lines 36 and 38 which are in turn connected to the secondary 14 of transformer 10. The input of rectifier 34 is connected to the secondary windings of the differential transformer 40. This differential transformer 40 has a single primary 46 connected to lines 36 and 38 and two secondaries 42 and 44 wound in opposition and connected in series. The core of differential transformer 40 is in two pieces, one core 48 being fixed and corresponding to winding 42. The other core 50 is movable in response to the position of the press crankshaft and corresponds to winding 44. The position of core 50 is such that when the press crank is at top dead center the core is completely in place within the transformer and when the press crank is at bottom dead center the core is completely withdrawn. At top dead center, with core 50 inserted all the way into the transformer, the voltages of windings 42 and 44 are equal and opposite and therefore no power is supplied to the input of rectifier 34. As core 50 is progressively withdrawn, the voltage in coil 44 becomes progressively smaller with the result that an increasing voltage corresponding to the difference between the voltages of coils 42 and 44 is applied to the rectifier 34.

In operation, control winding 26 is used to bias legs 18 and 20 of the magnetic amplifier 16 near saturation, the adjustable bias resistor 52 being used to regulate the current through bias winding 26. When windings 28 and 30 are disconnected, as will be explained hereinbelow, since the magnetic amplifier is not saturated, the inductive reactance of the legs 18 and 20 will be high. As a result, the impedance of the magnetic amplifier 16 will be very great as compared to that of the clutch operating valve solenoid 12 and the current through the clutch operating valve solenoid 12 will be insufficient to operate it. However, when windings 28 and 30, either separately or together as will be explained hereinafter, are used to supply additional flux in magnetic amplifier 16 the core will then be saturated with the result that the impedance of legs 18 and 20 is greatly decreased, thereby decreasing the voltage drop across the amplifier 16 and allowing sufficient current to flow through this circuit to energize the clutch operating valve solenoid 12.

A selector switch (not shown) is used to selectively operate switches 54, 56, 58 and 60 for jogging, single stroke or continuous stroke operation. Various means may be employed to operate these switches, it being only necessary that the indicated places in the circuits be opened or closed as desired.

Turning now to single stroke operation, with the press crankshaft at top dead center, switches 54 and 60 will be open and switches 56 and 58 closed, whereby magnetic amplifier 16 is connected to clutch operating valve solenoid 12. As aforesaid, the bias adjustment 52 has been so set that the flux produced by control winding 26 maintains the secondary legs 18 and 20 just below saturation to maintain clutch operating valve solenoid 12 deenergized. Run switch 62 in its normally closed position maintains contact from lines 36 and 38 through normally closed contact 64a of relay 64 to energize relay 66. This is the normal condition so long as run button 62 remains undepressed, switch 58 is closed, and power is supplied to the control circuit by transformer 10. When the operator presses the run button 62, the circuit is completed through contact 66a of relay 66 and normally closed top stop switch 68 to energize relay 70. The energization of relay 70 closes normally open contacts 70a and 70b in control winding 28 thereby connecting winding 28 to rectifier 32. The additional flux supplied to the magnetic amplifier 16 by the winding 28 is sufficient to drive the amplifier to saturation and energize clutch operating valve solenoid 12. This starts the press on a cycle of operation as is well understood in the art. At the same time the closing of relay 70 closes contact 70c thereby energizing relay 72. Relay 72 closes normally open contacts 72a and 72b of control winding 30 and thereby connects the control winding 30 to the output of rectifier 34. At the same time contact 72c which is in parallel with contact 70c closes so as to keep relay 72 energized even if contact 70c should open.

At this time, assuming the crankshaft has not yet started to rotate an appreciable amount from top dead center, core 50 is still fully inserted in differential transformer 40 and, therefore, as aforesaid, since rectifier 34 receives no power there will be no flux created in the magnetic amplifier 16 by control winding 30. As movement of the crankshaft gradually withdraws core 50 from the differential transformer 40, a flux is gradually supplied increasingly by control winding 30. Since, however, magnetic amplifier 16 is already saturated, this has no effect at the moment. As the output of differential transformer 40 increases, the current through relay 64 as regulated by resistor 74 gradually increases. When at some point in the down stroke the current becomes large enough to energize relay 64, normally closed contact 64a of relay 64 is opened. This in turn deenergizes relay 66 which in turn deenergizes relay 70 with the consequent deenergization of control winding 28. The point at which relay 64 is energized is chosen by the setting of resistor 74 to be a point in the operation of the crankshaft where core 50 is sufficiently withdrawn from the differential transformer 40 that the current supplied by control winding 30 is sufficient to maintain the magnetic amplifier 16 fully saturated when control winding 28 is deenergized. Therefore the clutch operating solenoid 12 will continue to remain energized.

The press continues through its cycle until the movable core 50 has reentered differential transformer 40 far enough to reduce the current in control winding 30 which, in turn, reduces the flux in the magnetic amplifier 16 to a point below saturation. At this point the clutch operating valve solenoid 12 is deenergized with the corresponding deenergization of the clutch and the energization of the brake in the usual manner. This brings the press crank to rest at top dead center completing the single stroke cycle of operation.

If the operator should release the run button 62 before the current in control winding 30 becomes sufficient to maintain the amplifier 16 at saturation, relay 70 will be deenergized with the corresponding deenergization of control winding 28. In this case the magnetic amplifier 16 will drop below saturation with the corresponding deenergization of clutch operating valve solenoid 12 and the concurrent stopping of the press. This provides a hold down feature as required by safety considerations of press operation. The length of this hold down time may be varied by adjusting the hold down control 71 which controls the current through control winding 30 and hence the point at which this winding alone will saturate the magnetic amplifier 16. If the operator should keep the run button 62 depressed during the complete cycle or if he should depress the run button 62 before relay 64 has been deenergized near the end of the cycle, the next cycle of the press would not be initiated. There is no way for relay 66 to be energized again after relay 64 has dropped out and contact 64a has closed, except through the normally closed side of the run button 62, because relay contact 66b is open. It therefore is necessary for the operator to release the run button 62 momentarily to pick up relay 66 and then depressing it again causes relay 70 to energize through contact 66a so that control winding 28 will be excited to provide sufficient flux in the magnetic amplifier 16 near top center of the crankshaft to cause the clutch operating valve solenoid 12 to again be energized. The above gives the so-called anti-repeat or single stroke protection necessary to prevent the continuous operation of the press. If relay 64 has a cut-out current appreciably lower than its cut-in current, it may be adjusted so that it does not cut out until after the current in winding 30 has dropped below saturation. In such case the clutch operating solenoid 12 will be deenergized before relay 66 can be manipulated to prevent the press brake from being applied at the end of a cycle.

It should be noted that relay 72 is energized on the first cycle of operation of the press and is not deenergized unless the emergency stop button 76 is depressed with the consequent deenergization of relays 66, 70 and 72. The purpose of relay 72 is to provide protection against the possibility of the operator jogging the press, in the manner explained hereinafter below, to near bottom dead center position and then turning the selector switch to single stroke. With the crank in this position the movable core 50 would be completely withdrawn from the differential transformer 40 and upon changing the selector switch the press would immediately start due to the fact that control winding 30 would then be saturating magnetic amplifier 16. If after jogging the press the operator were to turn the selector switch to single stroke position, relay 72 would be deenergized and contacts 72a and 72b would disconnect control winding 30 from rectifier 34. Therefore after the press has been jogged relay 72 is energized by contact 70c of relay 70 as described above.

When the selector switch is turned to continuous operation, switch 60 is additionally closed as shown in Figure 2. Then when run button 62 is depressed, the consequent energization of relay 70 closes contact 70d and maintains the energization of relay 70 after the run button 62 has been released. Thus as long as relay 70 remains continuously energized, control winding 28 at all times saturates the magnetic amplifier 16 and the fact that control winding 30 becomes intermittently active as movable core 50 goes in and out of the differential transformer 40 does not affect the saturated state of the amplifier 16. Thus the press continues to cycle. To stop the press, the emergency stop button 76 is depressed, thereby breaking the circuit and deenergizing relays 70 and 72 at once. This immediately deenergizes both control windings 28 and 30 so that regardless of the position of the crankshaft the clutch operating valve solenoid is deenergized and as usual the press brake is applied bringing the press to an immediate stop. However, if instead of emergency stop button 76, the top stop button 68 is depressed, only relay 70 is deenergized. Thus control winding 30 continues to maintain the saturation of magnetic amplifier 16 and the clutch valve of the press will not be deenergized until the crankshaft approaches top dead center in the manner of single stroke operation.

For the jogging operation the selector switch is moved to the jog position. This closes switch 54 and opens switches 56, and 58 and 60. The magnetic amplifier 16 and the rest of the control circuit is now isolated from clutch operating valve solenoid 12 and operation of the jog button 78 will then directly energize the clutch operating valve solenoid 12 without interference of the magnetic amplifier 16. This allows the press crank to be jogged to any position so as to locate the press slide at any desired point in its travel. When the jog button 78 is released the press slide stops immediately.

It is to be understood that the above described embodiment of this invention has been shown for purposes of illustration only. Other modifications and arrangements may become apparent to those skilled in the art and may be resorted to without departing from the scope and spirit of the invention which is intended to be limited only by the appended claims.

I claim:

1. In a control system for a power press of the type having a crankshaft, a flywheel drivingly connectable to said crankshaft, a clutch adapted to drivingly connect said flywheel to said crankshaft, solenoid means to engage and disengage said clutch, and an electrical control circuit adapted to energize said clutch during predetermined portions of a cycle of operation of said press, the combination with said control circuit of a magnetic amplifier adapted to actuate said solenoid means; a differential transformer adapted to energize said magnetic amplifier, said differential transformer including an adjustable core; means to vary the engagement of said core with said differential transformer responsive to the angular position of said crankshaft, whereby said solenoid means are energized and de-energized responsive to the position of said core in said transformer.

2. In a control system for a power press of the type having a crankshaft, a flywheel drivingly connectable to said crankshaft, a clutch adapted to drivingly connect said flywheel to said crankshaft, solenoid means to engage and disengage said clutch, and an electrical control circuit adapted to energize said clutch during predetermined portions of a cycle of operation of said press, the combination with said control circuit of a magnetic amplifier connected in series with said solenoid means; a differential transformer connected to said magnetic amplifier adapted to variably energize said magnetic amplifier; means to vary the energy output of said differential transformer including a core adapted to have variable engagement with said transformer; and means to synchronize the degree of engagement of said core in said transformer responsive to the angular position of said crankshaft, whereby said solenoid means are energized and de-energized responsive to the angular position of said crankshaft.

3. In a control system for a power press of the type having a crankshaft, a flywheel drivingly connectable to said crankshaft, a clutch adapted to drivingly connect said flywheel to said crankshaft, solenoid means to engage and disengage said clutch, and an electrical control circuit adapted to energize said clutch during predetermined portions of a cycle of operation of said press, the combination with said control circuit of a magnetic amplifier adapted to energize said solenoid means, said magnetic amplifier including a plurality of control windings; a run switch adapted when closed to energize one of said control windings to energize said soleonid means; a differential transformer connected to another of said control windings to energize said solenoid means independent of said first mentioned control windings; and means to vary the output of said differential transformer responsive to the rotation of said crankshaft to provide intermittent energization of said solenoid after said run switch is opened, whereby said solenoid means may be energized independent of said run switch.

4. In a control system for a power press of the type having a crankshaft, a flywheel drivingly connectable to said crankshaft, a clutch adapted to drivingly connect said flywheel to said crankshaft, solenoid means to engage and disengage said clutch, and an electrical control circuit adapted to energize said clutch during predetermined portions of a cycle of operation of said press, the combination with said control circuit of a magnetic amplifier adapted to energize said solenoid means, said magnetic amplifier including a first control winding; a run switch adapted when closed to selectively energize said first control winding whereby to saturate said magnetic amplifier and to energize said solenoid means; a second control winding at peak output adapted to saturate said magnetic amplifier; a differential transformer connected to said second control winding; and means to vary the output of said differential transformer responsive to the rotation of said crankshaft, whereby after said run switch is opened the energization of said solenoid is dependent on the variable output of said differential transformer.

5. In a control system for a power press of the type having a crankshaft, a flywheel drivingly connectable to said crankshaft, a clutch adapted to drivingly connect said flywheel to said crankshaft, solenoid means to engage and disengage said clutch, and an electrical control circuit adapted to energize said clutch during predetermined portions of a cycle of operation of said press, the combination with said control circuit of a magnetic amplifier adapted to energize said solenoid means; first and second control windings on said magnetic amplifier; a source of direct current; a differential transformer; means to vary the output of said transformer responsive to the rotation of said crankshaft; a first relay adapted to connect said first control winding to said differential transformer; a second relay adapted to connect said source of direct current to said second control winding, whereby said second control winding is adapted to saturate said magnetic amplifier to energize said solenoid means, and said first control winding is adapted to maintain the saturation of said magnetic amplifier during the peak output period of said differential transformer.

6. In a control system for a power press of the type having a crankshaft, a flywheel drivingly connectable to said crankshaft, a clutch adapted to drivingly connect said flywheel to said crankshaft, solenoid means to engage and disengage said clutch, and an electrical control circuit adapted to energize said clutch during predetermined portions of a cycle of operation of said press, the combination with said control circuit of a magnetic amplifier adapted to energize said solenoid means; first, second, and third control windings on said magnetic amplifier; a source of direct current; a differential transformer; means to vary the output of said transformer responsive to the rotation of said crank shaft; a first relay adapted to connect said first control winding to said differential transformer; a second relay adapted to connect said source of direct current to said second control winding; and means to connect said source of direct current to said third control winding, whereby said third control winding is adapted to bias said magnetic amplifier near saturation, said second control winding is adapted to saturate said magnetic amplifier to energize said solenoid means, and said first control winding is adapted to maintain the saturation of said magnetic amplifier during the peak output period of said differential transformer.

7. In a control system for a power press of the type having a crankshaft, a flywheel drivingly connectable to said crankshaft, a clutch adapted to drivingly connect said flywheel to said crankshaft, solenoid means to engage and disengage said clutch, and an electrical control circuit adapted to energize said clutch during predetermined portions of a cycle of operation of said press, the combination with said control circuit of a magnetic amplifier having its output winding in series with said clutch actuating solenoid; three control windings on said magnetic amplifier, the first of said windings being energized from a rectifier and adapted to bias the core of said amplifier near saturation, the second of said windings being energized by said rectifier, and the third of said windings being energized by a second rectifier; a differential tarnsformer having a pair of opposed windings connected to the input of said second rectifier; a core in fixed association with one of said secondary windings; a second core associated with the other of said secondary windings shiftable responsive to the rotation of said crankshaft; a first relay actuated by the output of said differential transformer; a run switch; a second relay actuated by said run switch and adapted to connect said second control winding to said rectifier; a third relay actuated by said second relay and adapted to connect said third control winding to said second rectifier; and a fourth relay responsive to actuation by said first relay to de-energize said second relay.

8. In a control system for a power press of the type having a crnakshaft, a flywheel drivingly connectable to said crankshaft, a clutch adapted to drivingly connect said flywheel to said crankshaft, solenoid means to engage and disengage said clutch, and an electrical control circuit adapted to energize said clutch during predetermined portions of a cycle of operation of said press, the combination with said control circuit of a magnetic amplifier adapted to energize said solenoid means, said magnetic amplifier including a first control winding to bias said magnetic amplifier near saturation; a second control winding; a run switch adapted when closed to selectively energize said second control winding whereby to saturate said magnetic amplifier and to energize said solenoid means; a third control winding; a differential transformer connected to said third control windings to energize said solenoid independent of said second control winding; and means to vary the output of said differential transformer responsive to the rotation of said crankshaft, whereby said solenoid means may be intermittently energized independent of the position of said run switch.

References Cited in the file of this patent
UNITED STATES PATENTS

| | | |
|---|---|---|
| 2,299,007 | Bundy | Oct. 13, 1942 |
| 2,575,792 | Bullard et al. | Nov. 20, 1951 |
| 2,577,882 | Foster | Dec. 11, 1951 |
| 2,598,321 | Usselman | May 27, 1952 |
| 2,636,138 | Few et al. | Apr. 21, 1953 |
| 2,675,507 | Geiger | Apr. 13, 1954 |
| 2,745,530 | Foster | May 15, 1956 |
| 2,794,971 | Hornfeck | June 4, 1957 |